Jan. 21, 1969  J. I. MOULTON  3,422,832
EXPLOSIVELY ACTUATED VALVE
Filed Feb. 27, 1967

INVENTOR.
JAMES I. MOULTON
BY Flehr, Hohbach, Test,
Albritton and Herbert
ATTORNEYS United States Patent Office 3,422,832
Patented Jan. 21, 1969

3,422,832
EXPLOSIVELY ACTUATED VALVE
James I. Moulton, Sunnyvale, Calif., assignor to Quantic Industries, Inc., San Carlos, Calif., a corporation of California
Filed Feb. 27, 1967, Ser. No. 618,865
U.S. Cl. 137—67            7 Claims
Int. Cl. F16k 31/12, 17/40

ABSTRACT OF THE DISCLOSURE

A cylindrical sleeve member is carried within the bore of a normally open valve body. The sleeve is expanded laterally against an encircling valve seat formed within the bore by explosively driving a movable wedging member along the axis of the closure member. The wedging member remains lodged in place to maintain the closure member expanded in sealing engagement with the valve seat. The sleeve ends are welded to the valve body whereby the gases of explosion are isolated from the fluid system controlled by the valve.

Background of the invention and objects

Figure 1:
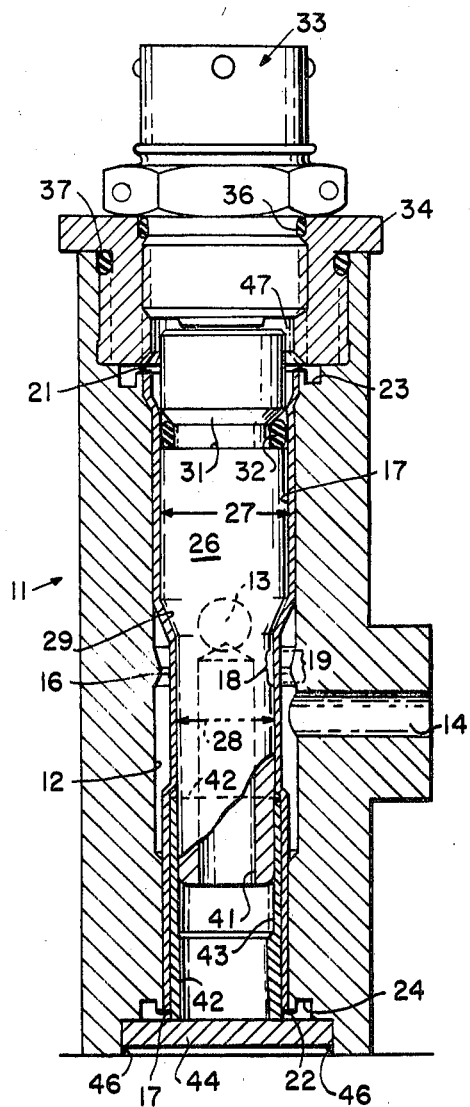

This invention relates to valves and more particularly to valves of a type which are maintained normally open but which are operated to a closed condition by a transient activating force. The valve construction is particularly useful as an explosively activated device as found, for example, in missile systems and the like.

Explosively activated valves of a type wherein a spool is driven longitudinally of the bore of the valve body, as normally constructed, are subject to problems of galling, and hence leakage, caused by longitudinal sliding movement between the valve spool and the valve seat.

Valves of the foregoing kind frequently are called upon to control the flow of liquids and gases of a type capable of attacking any of the usual resilient materials employed for forming seals.

Further, the usual explosively activated valves can contaminate the fluid being controlled by introducing into the fluid line the products of combustion developed by the explosive charge which activates the valve.

Accordingly, it is a general object of the present invention to provide an improved valve construction overcoming the foregoing and other limitations.

It is another object of the present invention to provide a normally open valve construction of a type arranged to be operated to a closed condition by a transient activating force wherein the products of combustion are isolated from the fluid stream being controlled.

Another object of the invention is to provide a normally open valve construction of the foregoing type wherein a valve closure member moves into sealing engagement with a valve seat in a direction essentially normal to the valve seat whereby relative sliding movement between the valve seat and closure member is essentially eliminated.

A further object of the invention is to provide a normally open valve construction of the foregoing type wherein until the valve is conditioned closed, the fluid path through the valve experiences a minimum change in fluid pressure.

These and other objects of the invention will become more readily apparent from the following detailed description of a preferred embodiment.

Summary of the invention

In general, a valve construction according to the invention comprises a valve body having a hollow interior. First and second flow passages define a flow path through the body via the hollow interior. A hollow deformable closure member is positioned within the interior of the valve body and a movable member is carried within the closure member for deforming it upon longitudinal movement of the movable member. Thus, a portion of the closure member is disposed, formed and adapted to be deformed by the movable member so as to urge the closure member into sealing relation with a portion of the hollow interior of the body upon longitudinal movement of the movable member within the closure member. Means forming a transient activating force, such as an explosive charge, serves to move the movable member to a position deforming the closure member into such sealing relation with the interior of the body. The movable member remains lodged within the closure member in position serving to maintain the deformation of the closure member against the pressure of the system.

Further, impervious means, such as a weld, serve to isolate the flow path through the body from the interior of the closure member so as to safeguard the fluid being controlled from receiving products of combustion of the explosive charge, as well as insuring that any noxious fluid within the system can not leak out.

Figure 2:
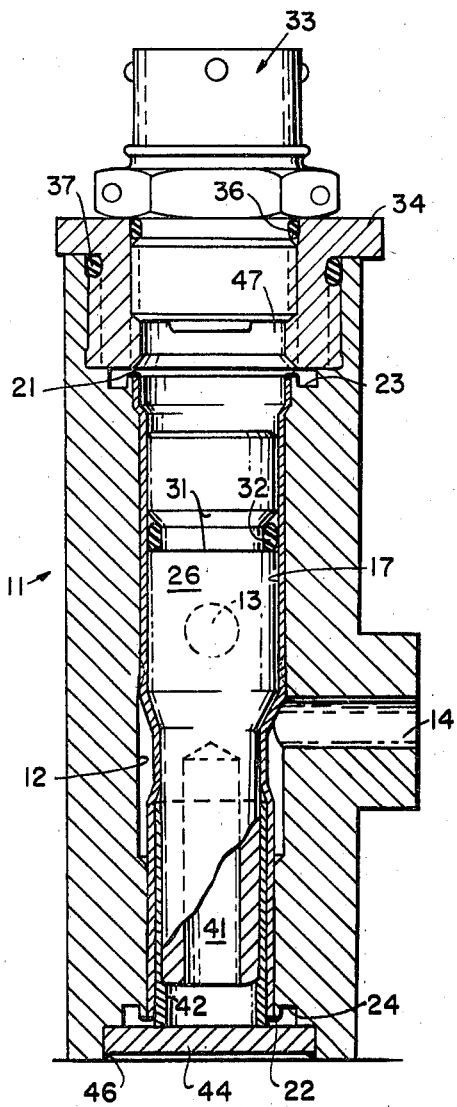

A particularly preferred embodiment according to the foregoing general summary of the invention is disclosed below as now to be described in conjunction with the drawings, in which:

FIGURE 1 is an elevation section view showing the valve construction prior to closure, according to the invention; and FIGURE 2 is an elevation section view similar to FIGURE 1 showing the valve construction in its closed condition.

Description of the preferred embodiment

Referring to the drawings, a valve body 11 having a generally cylindrical bore 12 is formed to include inlet and outlet flow passages 13, 14, respectively. An inwardly projecting surface portion 16 of bore 12 encircles the interior of bore 12 to form a valve seat region.

A hollow deformable closure member, in the form of a cylindrical sleeve 17 or liner, extends coaxially of bore 12. Sleeve 17 includes a deformable constricted interior side wall portion 18 and a peripheral sealing portion 19 extending around the exterior of sleeve 17 at an axial position disposed laterally adjacent valve seat 16. Welds 21, 22, respectively, form an impervious seal between the upper and lower ends of sleeve 17 and valve body 11.

Annular grooves 23, 24 formed around the upper and lower ends respectively of sleeve 17 serve to aid in applying welds 21, 22 by reducing the mass of valve body 11 adjacent thereto and in this manner serve to limit the heat dissipating effect of the mass of body 11 as would otherwise be caused.

A movable spool member 26 coaxially disposed within sleeve member 17 serves to outwardly deform or expand sleeve member 17 into sealing engagement with seat 16. Thus, spool member 26 includes a cylindrical portion 27 of generally enlarged diameter as compared to the diameter 28 of the lower end. A conical wedging surface 29 serves to deform sleeve member 17 under axial movement of spool member 26, and to expand sleeve member 17 in a direction primarily normal to seat region 16.

A groove 31 formed about the upper end of spool member 26 carries a conventional O-ring 32 so as to provide adequate sealing sufficient to maintain compression generated by detonation of a pyrotechnic cartridge assembly 33. Assembly 33 is of conventional design such as, for example, sold by Pelmec Division of Quantic Industries, Inc. of San Carlos, Calif., as their model No. 1287.

Assembly 33 is adapted to screw into the open upper end of a cartridge adaptor ring 34 which, in turn, screws into the threaded upper end of valve body 11. O-ring seals 36, 37 provide sealing respectively between assembly 33 and ring 34, and between ring 34 and valve body 11.

In order to minimize the creation of undesirable pressure changes in the fluid flow path through valve body 11, the flow conducting area transversely to the flow path at inlet 13 is substantially the same as the flow conducting area transversely of the flow path at outlet passage 14. In addition, the annular flow conducting area defined between valve seat 16 and sealing periphery 19 corresponds substantially to the flow conducting area of inlet passage 13 (or outlet passage 14). Thus, the existence of the valve in the flow path has no particular effect upon the fluid stream being controlled until cartridge assembly 33 is deonated to provide the transient activating force for moving spool member 26 axially of valve body 11.

Spool member 26 has been counterbored at 41 to reduce the weight of the valve assembly and to provide an expansion chamber for receiving any gas which may leak past O-ring 32 during firing of the valve.

A reinforcement sleeve 42, formed with a counterbored portion 43, permits the lower end of member 26 to slide therealong until arrested by an interference fit with the relatively constricted lower end thereof thereby dissipating the energy of member 26. Sleeve 42 further serves to prevent collapse of sleeve 17 when the valve construction is disposed in extremely high pressure systems.

A closure plate 44, welded at 46 to valve body 11, prevents the escape of products of combustion from valve body 11 whereby the products of combustion remain contained within the chamber defined by sleeve 42 and the counterbored portion 41.

The thickness of deformable sleeve member 17 is determined by the external pressure of the system in which it is being used and by the energy desired to be employed in deforming the walls of member 17. In any event, the wall thickness of member 17 is relatively thin and ductile subject, for example, to accommodating a twenty percent stretch with minimum energy. Three-hundred series stainless steel can be used, for example, member 17 may preferably be of a No. 304 stainless steel.

Spool member 26 is preferably heat treated stainless steel so as to minimize galling between member 26 and member 17. By reducing galling, the friction is also reduced between these two members, and if desired, graphite lubrication can be provided to further reduce the friction between members 26 and 17. A particularly preferred stainless steel for member 26 is No. 17/4 stainless which has been heat treated.

Using the above materials, it has been observed that there is no apparent plastic deformation of seat 16 caused by closure.

A valve contruction, according to the above arrangement, can serve to control gas or liquid fluid flow. In a liquid system of a type where, for example, the hollow interior of valve body 11 is filled with liquid at the time that spool member 26 is moved axially to close the valve, and if there is no fluid reservoir to absorb the reduction in system volume caused by the shifting of valve spool member 26, it will be readily apparent that the shifting of spool member 26 may cause damage to the system of an undesirable surge in the system pressure. Accordingly, the outlet line (not shown) coupled to outlet passage 14 may be of oval cross-section in order to permit expansion thereof to full round under such conditions.

While operation of the valve construction is deemed to be relatively obvious from the foregoing description, it will be readily apparent that upon detonation of the pyrotechnic charge in assembly 33, pressure will build up in the pyrotechnic cavity 47 above member 26. The explosive expansion of gases in cavity 47 serves to force member 26 downwardly (as shown) thereby causing the sealing periphery 19 of member 17 to be expanded by the wedging action of the conical surface portion 29 of member 26. The sealing periphery 19 of member 17 moves radially outwardly in a direction normal to valve seat surface 16 so as to eliminate the possibility of relative sliding movement therebetween.

In this manner, the flow of fluid, either gas or liquid, through the annular flow passage defined between member 17 and the interior of bore 12 will be sealed closed. Any explosion gases passing between member 26 and sleeve member 17 enter into the chamber defined by counterbored portion 41 and sleeve 42 whereby they will not escape. In addition, the products of combustion are precluded by means of impervious welds 21, 22 from entering the fluid flow path defined between inlet and outlet passages 13, 14.

What is claimed is:

1. In a valve of a type normally conditioned open and operated to a closed condition by a transient activating force, the construction comprising a valve body member having a hollow interior, inlet and outlet flow passages defining a flow path through said body member via said interior, a surface portion encircling said interior between said inlet and outlet passages and forming a valve seat region therearound, a hollow sleeve member within said interior, said sleeve member including a sealing periphery therearound normally spaced from said valve seat region, and means forming a transient activating force, including a movable member within said sleeve, acting to expand said periphery against and in a direction primarily normal to said seat region to close said flow path.

2. A valve construction as defined in claim 1 wherein the last named means includes means forming an explosive charge disposed to drive the last named member longitudinally of the sleeve member to a position serving to lodge the member laterally of said seat to expand and retain said sleeve member against said seat in sealing engagement therewith.

3. A valve construction according to claim 1 wherein the flow conducting area defined transversely of the flow path at said inlet and outlet passages is substantially the same and corresponds substantially to the flow conducting area defined transversely of the flow path between said seat region and said sealing periphery when said valve is conditioned open to thereby maintain fluid pressure substantially constant along the flow path passing through said valve.

4. A valve construction comprising means forming a valve body member having a hollow interior, inlet and outlet flow passages defining a flow path through said body member via said interior, a hollow closure member within said interior, impervious means isolating said flow path from the interior of said closure member, and means forming a transient activating force, including a movable member within said closure member, acting to expand said closure member in a direction primarily normal to and into sealing relation with a portion of said hollow interior to close said flow path.

5. A valve construction comprising means forming a valve body having a hollow interior, first and second flow passages defining a flow path through said body via said interior, a hollow deformable closure member within said interior, a movable member within said closure member, said closure member including a portion disposed, formed and adapted to be deformed into sealing relation with a portion of said hollow interior by longitudinal movement of said movable member, and an explosive charge forming a transient activating force serving to move said movable member to a position deforming said portion of the closure member into sealing relation with the interior of said body and to lodge said movable member thereat to maintain the deformation of said closure member in said relation.

6. A valve of a type normally conditioned open and operated to a closed condition by a transient activating force, comprising a valve body having a hollow interior, inlet and outlet flow passages defining a flow path through said body via said interior, an inwardly projecting surface portion encircling said interior between said inlet and outlet passages and forming a valve seat region therearound, a hollow sleeve member within said interior, said sleeve member having a deformable constricted interior side wall portion thereof and a sealing periphery extending around the exterior of said sleeve member laterally adjacent said seat region, said periphery being normally spaced from said seat region to form a portion of said flow path, a movable member within said sleeve member and having a wedging surface therearound serving to wedge said constricted portion outwardly to move said periphery in a direction primarily normal to said seat region and into sealing engagement therewith, and means for so moving said movable member to close said flow path.

7. In a normally open valve construction, means forming a valve body, a cylindrical bore in said body, passages defining a flow path axially of the body, a valve seat formed around the interior wall of said bore, a cylindrical valve closure member within said bore and spaced adjacent said seat, and a movable member within said closure member and formed with an enlarged wedging surface serving to force the wall of said closure member laterally in a direction primarily normal to said seat and essentially free of relative sliding movement between said seat and said closure member to close said flow path thereat, said member being adapted to be driven along said closure member by a transient activating force.

References Cited

UNITED STATES PATENTS

| 2,997,051 | 8/1961 | Williams | 137—68 |
| 3,027,903 | 4/1962 | Thorp | 137—68 |
| 3,242,939 | 3/1966 | Fogg | 137—67 |

NATHAN L. MINTZ, *Primary Examiner.*